Aug. 4, 1953  P. B. REEVES  2,647,410
MAGNESIUM-ALLOY-BLOCK EDGE-ACTIVE DRIVING BELT
Filed July 3, 1950
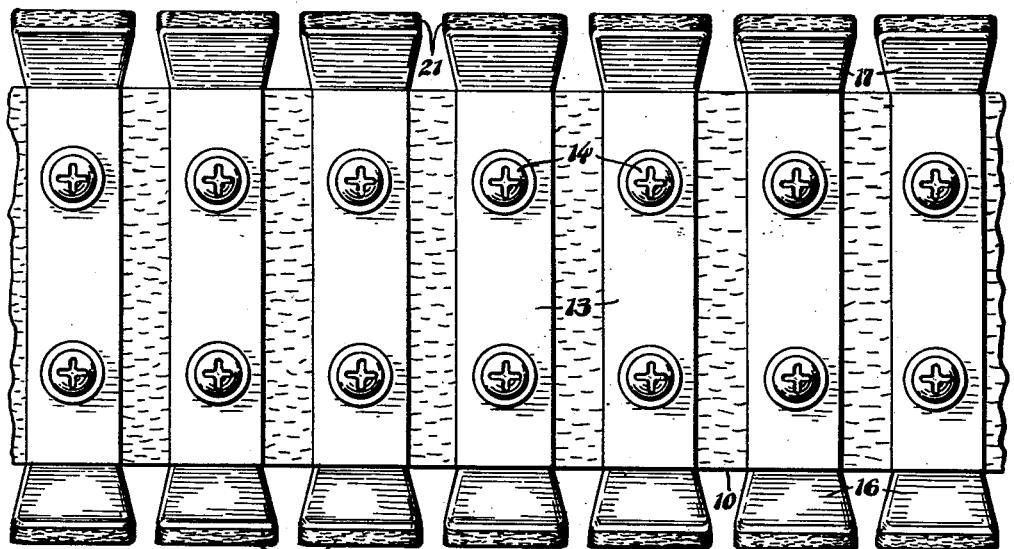
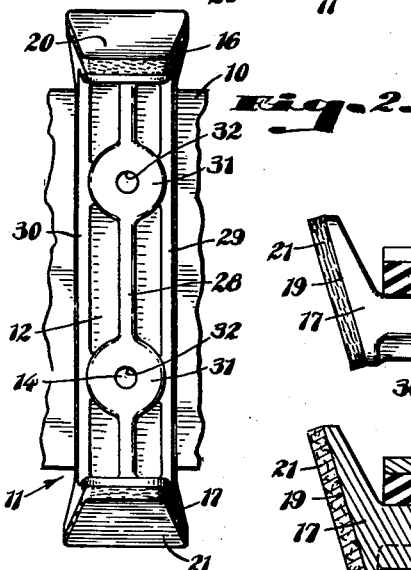
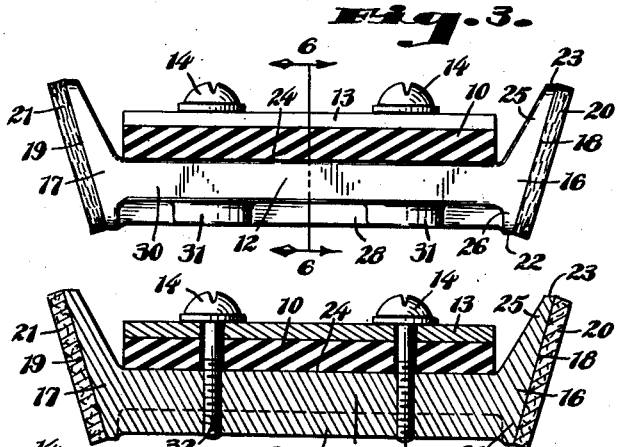
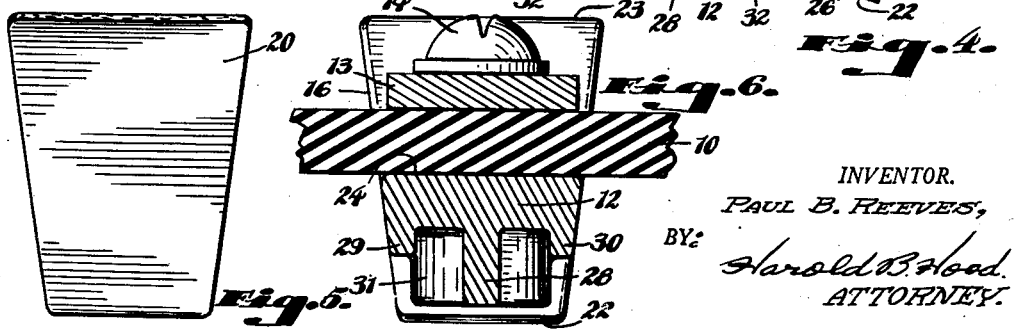
INVENTOR.
PAUL B. REEVES,
BY: Harold B. Hood.
ATTORNEY.

Patented Aug. 4, 1953

2,647,410

UNITED STATES PATENT OFFICE 2,647,410

MAGNESIUM-ALLOY-BLOCK EDGE-ACTIVE DRIVING BELT

Paul B. Reeves, Columbus, Ind., assignor to Reeves Pulley Company, Columbus, Ind., a corporation of Indiana Application July 3, 1950, Serial No. 171,783

3 Claims. (Cl. 74—236)

The present invention relates to power transmission belts, and more particularly to the type of belts intended to cooperate with coned sheaves, and comprising a band or web of material of high tensile strength but readily flexible both longitudinally and laterally, carrying a longitudinally spaced series of transversely extending stiffener block units. The invention is particularly directed to such stiffener blocks; and the primary object of the invention is to provide an improved form of stiffener block for use in such an environment.

Belts of the character here under consideration find their primary utility in speed varying transmission units of the character widely known as the "Reeves" type. Such a transmission comprises a pair of parallel shafts on each of which is mounted a sheave made up of mating coned discs, the discs of each sheave being axially relatively adjustable, and the two sheaves being drivingly connected through the medium of an edge-active belt. The lateral edges of such a belt must frictionally engage the facing coned surfaces of the discs of the respective pulleys in order to provide a driving connection therebetween; but the belt edges must be movable, radially of the discs, during adjustment of the discs. The belt body must, of course, flex readily about transverse axes at it turns around the sheaves; but it must be rigid, with respect to longitudinally-extending axes, in order that it may sustain the pressure transversely exerted against the belt by the mating discs. That transverse rigidity is provided by the stiffener blocks to which this disclosure is primarily directed.

Since the original invention of this type of transmission, and until very recent years, it has been the universal practice to use wooden stiffener blocks nailed to the flexible belt band, and provided, at their laterally opposite ends, with tips of suitable friction material nailed to the blocks. Wood has been used, in preference to other materials, because the ratio of its weight to its compression strength is more advantageous than that of other materials heretofore available for such use. Excessive weight, obviously, is undesirable, since the belts move at relatively high speed so that centrifugal forces, as the blocks turn about the pulleys, can become highly detrimental to the operation of the transmission. Such forces tend to increase the tensile stresses applied to the belt band, and also tend to move the belt radially outwardly with respect to the cone faces, thus tending to relax the frictional engagement between the cone faces and the block tips.

Some experimental work with metal belt blocks has been done within the past several years; but, prior to my invention, the art has not been able to develop any metal belt block possessing a satisfactory ratio of weight to compressive strength. This has been due, in part, to the failure of the art to evolve a block design which, while utilizing a minimum mass of material, will provide a satisfactory strength.

It is an ancillary object of the present invention to provide a specific shape of stiffener block which, when embodied in a magnesium-aluminum alloy, will meet the requirements of a metal stiffener block to be used in a belt of the character here under consideration.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a plan view of a fragment of a belt of the character here under consideration, constructed in accordance with the present invention;

Fig. 2 is a bottom plan view of a block constructed in accordance with the present invention;

Fig. 3 is a transverse section through the belt of Fig. 1 showing one block in elevation;

Fig. 4 is a central section through such a block;

Fig. 5 is an end elevation of such a block, taken upon a enlarged scale; and

Fig. 6 is a longitudinal section, taken substantially on the line 6, 6 of Fig. 3, and drawn to the scale of Fig. 5.

Referring more particularly to the drawings, it will be seen that I have illustrated a fragment of a belt band 10 which may be of conventional character, a longitudinally spaced series of transversely-extending stiffener blocks, indicated generally by the reference numeral 11, being secured thereto in accordance with conventional practice as described above.

Each block 11 comprises a transversely-extending beam 12 and a clamping plate 13, together with means, such as the screws 14, for clamping the beam and the plate to the belt band 10 in a manner which will be described in further detail hereinafter.

At its opposite ends, the beam 12 integrally carries wing members 16 and 17. Said members 16 and 17 are formed to provide laterally outwardly presented faces 18 and 19 which are allochirally inclined to the plane indicated by the section line 6, 6. Each such face inclines outwardly and upwardly from its inner or lower end 22 to its outer or upper end 23. A pad 20 of friction material is adhesively secured to the face 18 and a similar pad 21 is similarly secured to the face 19.

The beam 12 is formed to provide an upwardly-facing plane surface 24 whose transverse extent is substantially equal to the transverse dimension of the band 10, and which is engaged with the inner surface of the band. Each wing member 16 and 17 comprises a portion 25 projecting upwardly beyond the beam 12 and a portion 26 projecting downwardly beyond the beam 12; and each such portion tapers in thickness, in the direction of length of the beam 12, as it retreats from said beam.

The lower or inner surface of the beam 12 is provided with a median, longitudinally-extending, reinforcing rib 28 of substantial depth; and with two further reinforcing ribs 29 and 30 located at its opposite edges. I have found, by experimentation, that the three ribs thus provided, and extending continuously between the roots of the wing members 16 and 17, provide the strength necessary for sustaining the compressive stresses which are applied to these blocks in use.

The lower surface of the beam 12 is further provided with two laterally spaced bosses 31, 31 which are centrally penetrated by tapped bores or sockets 32, 32 for the reception of the clamping screws 14. These perforations are desirably located within the rib 28, as shown.

In use, the belt band 10 is supported upon the surface 24 of the beam 12. A plate 13 is then located on the outer surface of the band 10, in registry with the beam 12, and screws 14 are passed through the plate and the band 10 and are entered in the bores 32 and turned down until the screw heads clamp the band between the plate 13 and the surface 24 of the beam 12.

It is desirable that the belt band shall be located substantially in the plane bisecting the lengths of the faces 18 and 19 of the wing members 16 and 17. To this end, the surface 24 is preferably located in a plane depressed below said bisecting plane by an amount not exceeding one-half the thickness of the band 10.

I have found that an optimum shape for the surfaces 18 and 19, and for the pads 20 and 21 carried thereby, is that illustrated in Fig. 5, in which said surfaces flare uniformly from their inner ends to their outer ends, as shown.

I presently believe the details of construction of the block, as herein disclosed and claimed, to be optimum, and that any substantial departure from the structure defined in the appended claims will have a deleterious effect upon the belt as a whole, when used in an environment of the character above described. The specific structure shown, when embodied in a magnesium-aluminum alloy, provides a ratio of weight to compressive strength at least as satisfactory as that possessed by the wood blocks used effectively for so many years prior to the invention. Manufacturing expense, on the other hand, is substantially reduced by the use of blocks constructed in accordance with the present invention.

I claim as my invention:

1. A belt comprising a body strand of material of high tensile strength but readily flexible both longitudinally and laterally, and a plurality of longitudinally-spaced, transversely-rigid stiffener blocks secured to said body, each of said blocks comprising a transverse beam integrally carrying members at its opposite ends formed to provide oppositely-facing surfaces allochirally angularly related to a plane perpendicular to said beam, one surface of said beam engaging the inner surface of said body, the opposite surface of said beam being provided with a central rib and two flanking ribs extending from one to the other of said members, a clamping plate engaging the outer surface of said body in registry with said beam, and means penetrating said body and engaging said beam and said plate to secure said beam and plate to said body.

2. A transverse stiffener block for belts comprising a transverse beam integrally carrying members at its opposite ends formed to present oppositely-facing surfaces allochirally angularly related to a plane perpendicular to said beam, said faces projecting above and below the median plane of said beam, said beam being formed with an upwardly presented surface extending continuously between said members, the opposite surface of said beam being formed to provide a median, longitudinally-extending, reinforcing rib and two longitudinally-extending, reinforcing ribs at its opposite edges, a clamp plate for cooperation with said beam surface to clamp therebetween a portion of a belt band, and means cooperating with said beam and said plate to urge said plate toward said beam surface.

3. The block of claim 2 in which said last-named means comprises a plurality of screws penetrating said plate and threadedly engaged in sockets formed in said beam and located in said median rib.

PAUL B. REEVES.

References Cited in the file of this patent

UNITED STATES PATENTS

| Number | Name | Date |
|---|---|---|
| 1,546,704 | Barker | July 21, 1925 |
| 2,322,466 | Perry | June 22, 1943 |
| 2,406,253 | Reeves | Aug. 20, 1946 |